(12) United States Patent
Kim

(10) Patent No.: US 11,673,656 B2
(45) Date of Patent: Jun. 13, 2023

(54) AIR MOBILITY CONTROL SYSTEM AND AIR MOBILITY CONTROL METHOD

(71) Applicants: Hyundai Motor Company, Seoul (KR); Kia Motors Corporation, Seoul (KR)

(72) Inventor: Woo Sung Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 270 days.

(21) Appl. No.: 17/075,145

(22) Filed: Oct. 20, 2020

(65) Prior Publication Data

US 2021/0354806 A1 Nov. 18, 2021

(30) Foreign Application Priority Data

May 12, 2020 (KR) .................. 10-2020-0056766

(51) Int. Cl.
*B64C 25/30* (2006.01)
*B64D 17/80* (2006.01)
*B64D 25/00* (2006.01)
*G08G 5/02* (2006.01)

(52) U.S. Cl.
CPC .............. *B64C 25/30* (2013.01); *B64D 17/80* (2013.01); *B64D 25/00* (2013.01); *G08G 5/02* (2013.01)

(58) Field of Classification Search
CPC combination set(s) only.
See application file for complete search history.

(56) References Cited

U.S. PATENT DOCUMENTS

| 10,831,192 | B1* | 11/2020 | Piasecki | G05D 1/0077 |
| 2007/0145193 | A1* | 6/2007 | Hakki | B64D 17/80 244/139 |
| 2018/0334251 | A1 | 11/2018 | Karem et al. | |
| 2020/0027358 | A1* | 1/2020 | Fine | G08G 5/0078 |
| 2020/0354049 | A1* | 11/2020 | Noppel | G05D 1/0088 |

OTHER PUBLICATIONS

Deener, Sarah "How it works: airframe parachute" Mar. 1, 2018, AOPA (Year: 2018).*

* cited by examiner

*Primary Examiner* — Maceeh Anwari
(74) *Attorney, Agent, or Firm* — Fox Rothschild LLP

(57) ABSTRACT

An air mobility control system is provided. The system includes one or more shock absorbing units that are mounted in an aircraft and are configured to absorb a vertical force impacting on the air mobility vehicle. A distance sensor is mounted in the air mobility vehicle and is configured to sense the distance to a ground or an approaching object. A safety controller is configured to detect an abnormal descent of the air mobility vehicle and to operate the one or more shock absorbing units to be deployed according to the distance sensed by the distance sensor.

9 Claims, 4 Drawing Sheets

AIR MOBILITY CONTROL SYSTEM AND AIR MOBILITY CONTROL METHOD

CROSS REFERENCE TO RELATED APPLICATION

The present application claims priority to Korean Patent Application No. 10-2020-0056766, filed May 12, 2020, the entire contents of which is incorporated herein for all purposes by this reference.

BACKGROUND

Field of the Disclosure

The present disclosure relates to an air mobility control system and an air mobility control method, and more particularly, to an air mobility control technology for protecting the passengers of an aircraft and minimizing injuries to people and damage to objects on the ground in the event of an aircraft collision.

Description of the Related Art

There is a growing interest in urban air mobility (UAM) due to severe environmental pollution and traffic congestion in cities. Urban air mobility (UAM) refers to effective urban transportation systems that reduce urban traffic congestion and environmental pollution. The requirements for air mobility aircraft include: having a capacity of many passengers; being capable of taking off and landing vertically in a small area to avoid the need of a runway; being configured in a manner that passengers may conveniently enter and exit; and being designed considering noise and vibration caused by propellers.

In connection with the use of air mobility aircraft, an event in which the aircraft flying in the air becomes uncontrollable due to external or internal factors may occur. In particular, the air mobility aircraft may crash to the ground. Existing air mobility aircraft such as helicopters are not sufficiently equipped with an appropriate protection device for protecting the passengers. Therefore, the passengers may be severely injured in the event of an aircraft crash.

The foregoing is intended merely to aid in the understanding of the background of the present disclosure, and is not intended to mean that the present disclosure falls within the purview of the related art that is already known to those skilled in the art.

SUMMARY

The present disclosure provides a safety control technology for minimizing injury to people and damage to objects in the event of an aircraft crash.

In order to accomplish one objective of the disclosure, an exemplary embodiment of the present disclosure provides an air mobility control system that may include one or more shock absorbing units mounted in an air mobility vehicle and configured to absorb a vertical force impacting on the air mobility vehicle; a distance sensor mounted in the air mobility vehicle and configured to sense a distance from air mobility to a ground or an object that the air mobility vehicle approaches; and a safety controller configured to detect an abnormal descent of the air mobility vehicle and to operate the one or more shock absorbing units to be deployed based on the distance sensed by the distance sensor.

The one or more shock absorbing units may include an airbag cushion deployed downward from the air mobility vehicle and an inflator that injects gas into the airbag cushion. The one or more shock absorbing units may be multiple shock absorbing units that are spaced from each other in a front-rear direction or a left-right direction of the air mobility vehicle. The distance sensor may be configured to sense the distance from air mobility to a ground or an object that the air mobility vehicle approaches, and the safety controller may be configured to operate the shock absorbing units to be deployed when the distance sensed by the distance sensor is equal to or less than a predetermined reference distance in response to detecting an abnormal descent of the air mobility vehicle.

The air mobility control system may further include: one or more descending slowdown units deployed upward from the air mobility vehicle to increase a force resisting to the gravity of the air mobility vehicle; and an altitude sensor configured to sense the altitude of the air mobility vehicle and mounted in the air mobility vehicle. The safety controller may be configured to operate the one or more descending slowdown units to be deployed based on the altitude of the air mobility vehicle, which is sensed by the altitude sensor, in response to detecting an abnormal descent of the air mobility vehicle. The safety controller may be configured to operate the one or more descending slowdown units to be deployed when the altitude sensed by the altitude sensor during an abnormal descent of the air mobility vehicle is equal to or greater than a predetermined reference altitude.

The air mobility control system may further include an orientation sensor configured to sense the yaw, pitch, or roll of the air mobility vehicle. The one or more descending slowdown units may be multiple descending slowdown units which are spaced from one another in the front-rear direction or the left-right direction of the air mobility vehicle. The safety controller may be configured to operate a part of the entirety of the multiple descending slowdown units to be deployed according to the yaw, pitch, or roll of the air mobility vehicle, which is sensed by the orientation sensor.

The air mobility control system may further include a communication unit. When the safety controller detects an abnormal descent of the air mobility vehicle or operates the one or more shock absorbing units to be deployed, the position of the air mobility vehicle may be transmitted to an external device via the communication unit.

In order to accomplish the objective of the present disclosure, another exemplary embodiment of the disclosure provides an air mobility control method that may include detecting an abnormal descent of an air mobility vehicle; sensing a distance from air mobility to a ground or an approaching object when an abnormal descent of the air mobility vehicle is detected; and operating one or more shock absorbing units to be deployed downward from the air mobility vehicle based on the sensed distance. In the operating of the one or more shock absorbing units, the one or more shock absorbing units may be deployed when the sensed distance to the ground or the approaching object is less than a predetermined reference distance.

The method may further include: sensing the altitude of the air mobility vehicle when an abnormal descent of the air mobility vehicle is detected; and operating one or more descending slowdown units to be deployed upward from the air mobility vehicle according to the sensed altitude to increase a resisting force to the gravity of the air mobility vehicle. In the operating of the one or more descending slowdown units may be deployed when the altitude when sensed during an abnormal descent of the air mobility vehicle is equal to or greater than a predetermined reference altitude.

The one or more descending slowdown units may be multiple descending slowdown units arranged at intervals in a front-rear direction or a left-right direction. The method may further include sensing a yaw, pitch, or roll of the air mobility vehicle and operating a part or the entirety of the multiple descending slowdown units to be deployed. The air mobility control system and method that embody the present disclosure have an effect of minimizing injury to the passengers of an aircraft in the event of an aircraft crash. In addition, when an aircraft crashes into a structure (for example, tall building) standing on the ground, the air mobility control system and method that embody the present disclosure have an effect of minimizing injury to the passengers of the aircraft and damage to the structure on the ground.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
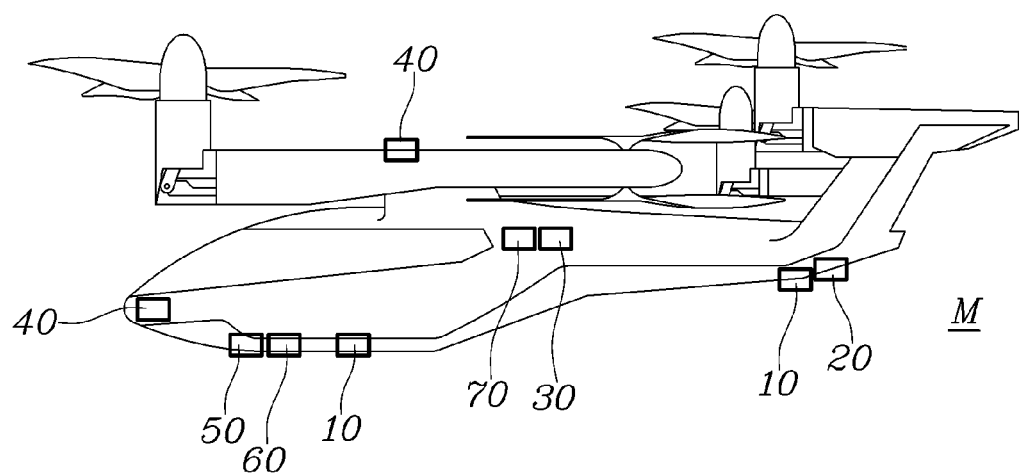
FIGS. 1 to 2 are a schematic view and a block diagram illustrating the construction of an air mobility control system according to in accordance with an exemplary embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural or functional descriptions of exemplary embodiments of the present disclosure disclosed in the present specification or application are provided only for illustrative purposes. The present disclosure can be embodied in various forms and it should not be construed that exemplary embodiments of the disclosure are limited only to the embodiments described in the specification of the present application.

There can be various exemplary embodiments in accordance with the concept of the present disclosure, and only some exemplary embodiments will be illustrated in the drawings and described in detail in the description below. While specific exemplary embodiments of the present disclosure are described herein below, they are only for illustrative purposes and should not be construed as limiting to the present disclosure. Thus, the present disclosure should be construed to cover not only the specific exemplary embodiments but also cover all modifications, equivalents, and substitutions that fall within the concept and technical spirit of the present disclosure.

Terms used in the specification, "first", "second", etc. may be used to discriminate one element from another element, but the order or priority of the elements are not limited by the terms unless specifically stated. Accordingly, a first element in an exemplary embodiment may be referred to as a second element in another exemplary embodiment, and similarly, a second element in an embodiment may be referred to as a first element in another exemplary embodiment, only for the purpose of discrimination of one element from another element, without departing from the scope of the disclosure as claimed.

It will be understood that when any element is referred to as being "connected" or "coupled" to another element, one element may be directly connected or coupled to the other element, or an intervening element may be present therebetween. In contrast, it should be understood that when an element is referred to as being "directly coupled" or "directly connected" to another element, there are no intervening elements present between them. Other expressions describing relationships between elements, for example, "between", "directly between" "adjacent to", "directly adjacent" should be interpreted in the same manner.

The terminology used herein is for the purpose of describing particular exemplary embodiments only and is not intended to be limiting. As used herein, the singular forms "a", "an", and "the" are intended to include the plural forms as well unless the context clearly indicates otherwise. It will be further understood that the terms "comprises", "includes", or "has" when used in the present disclosure specify the presence of stated features, regions, integers, steps, operations, elements and/or components, but do not preclude the presence or addition of one or more other features, regions, integers, steps, operations, elements, components and/or combinations thereof.

In addition, unless otherwise defined, all terms including technical and scientific terms used herein have the same meaning as commonly understood by those who are ordinarily skilled in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the present disclosure will be described in detail with reference to the accompanying drawings. Through the drawings, like reference symbols denote like elements.

Figure 2:
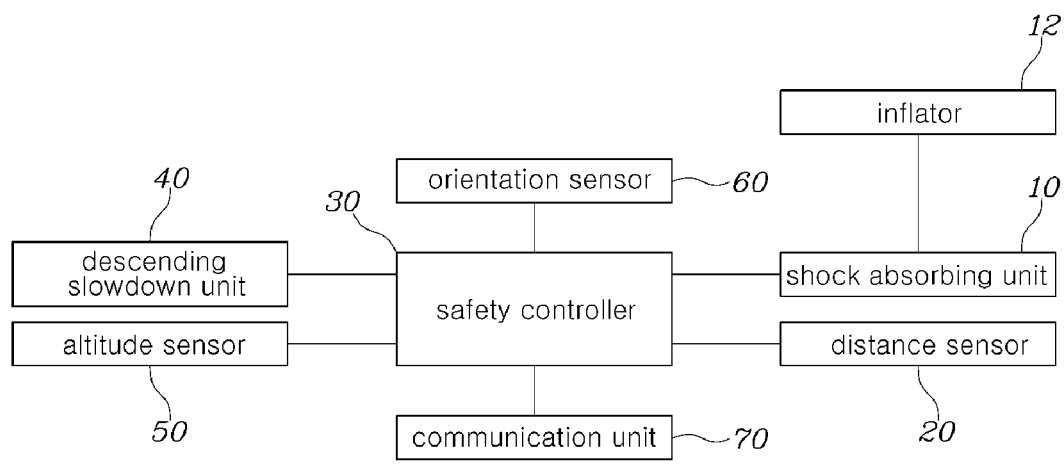
Figure 3:
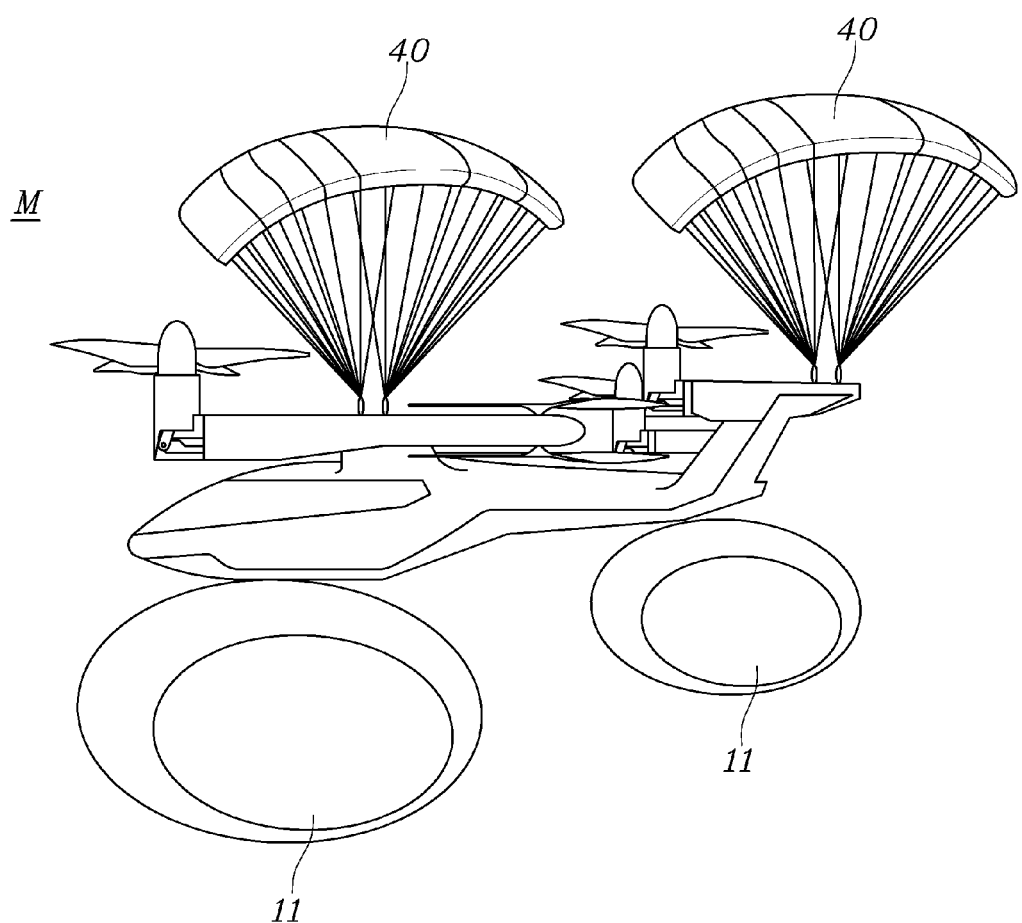
FIG. 3 is a schematic view illustrating such an aircraft when a shock absorbing unit and a descending slowdown unit thereof are deployed in accordance with an exemplary embodiment of the disclosure.

FIGS. 1 and 2 illustrate the construction of an air mobility control system in accordance with an exemplary embodiment of the disclosure, and FIG. 3 illustrates an aircraft M with a shock absorbing unit 10 and a descending slowdown unit 40 as deployed in the air mobility control system in accordance with an exemplary embodiment of the present disclosure.

Referring to FIG. 3, the air mobility control system may include: one or more shock absorbing units 10 mounted in an air mobility vehicle M and deployed downward from the air mobility vehicle M; a distance sensor configured to sense the distance from air mobility M to a ground or an object that the air mobility vehicle M approaches such as the earth surface or an obstacle; and a safety controller 30 configured to detect an abnormal descent of the air mobility vehicle M and execute the deployment of the one or more shock absorbing units 10 according to the sensed distance from air mobility M to a ground or an object.

The shock absorbing units 10 may be mounted in the air mobility vehicle M and operated to be deployed by the safety controller 30. In one exemplary embodiment, the shock absorbing unit 10 may be implemented with an airbag module that is inflated at the time of being deployed. The shock absorbing unit 10 may be deployed downward from the air mobility vehicle M to absorb a vertical impact on the bottom of the air mobility vehicle M. The shock absorbing unit 10 may be deformed when impacted, thereby reducing an impact between the air mobility vehicle M and an obstacle.

The distance sensor 20 may be configured to monitor the surrounding environment of the air mobility vehicle M and sense the distance to from air mobility M to the ground or the object such as the earth surface or an obstacle. The obstacle refers to a structure with which the air mobility vehicle M is likely to collide in the event of a crash. For example, the obstacle may be a tall building. The safety controller 30 may be configured to detect an abnormal descent of the air mobility vehicle M. An abnormal descent of the air mobility vehicle M refers to an uncontrolled rate of falling of the air mobility vehicle M due to external factors such as strong wind or internal factors such as failure of a motor.

In other words, the safety controller 30 may be configured to detect an abnormal descent of the air mobility vehicle M when the flight of the air mobility vehicle M is unable to be controlled. The safety controller 30 may be configured to operate the shock absorbing unit 10 to be deployed based on the distance distanced by the distance sensor 20. The safety controller 30 may be configured to sense the distance to a potential obstacle with which the air mobility vehicle M is likely to collide and deploy the shock absorbing unit 10 before the air mobility vehicle M collides with the obstacle. In other words, the shock absorbing unit may be configured to reduce the impact between the air mobility vehicle M and the obstacle when the air mobility vehicle M crashes, thereby minimizing injury to the passengers and damage to the object with which the air mobility vehicle M collides.

In the related art, only the altitude of the air mobility vehicle M is sensed. Therefore, in the air mobility vehicle M in the related art it is not possible to predict a collision with an obstacle on the ground since the distance between the air mobility vehicle M and the obstacle are unable to be detected. The safety controller 30 in one exemplary embodiment of the present disclosure may be implemented with: a non-volatile memory (not shown) configured to store data associated with an algorithm configured to execute the operation of various components of the air mobility vehicle or with software instructions to execute the algorithm; and a processor (not shown) configured to perform the operations described below using the data stored in the non-volatile memory. The memory and processor may be implemented with discrete chips, respectively. The memory and processor may be implemented with an integrated chip. The processor may be implemented with an array of processors.

In one exemplary embodiment, the shock absorbing unit 10 may include an airbag cushion 11 deployed downward from the air mobility vehicle M and an inflator 12 that injects gas into the airbag cushion 11. In other words, the shock absorbing unit 10 may be implemented with an airbag module 10 including the airbag cushion 11 and the inflator 12. Specifically, the safety controller 20 may be configured to execute the operation of the inflator 12. The inflator 12 may be operated to inject gas into the airbag cushion 11 to thus deploy the airbag cushion 11 downward from the air mobility vehicle M.

The one or more shock absorbing units 10 may be multiple shock absorbing units that are arranged at intervals in a front-rear direction or a left-right direction of the air mobility vehicle M. The shock absorbing units 10 may be disposed in a front portion and a rear portion of the air mobility vehicle M, respectively. Alternatively, the shock absorbing units 10 may be disposed in a left portion and a right portion of the air mobility vehicle M. The safety controller 30 may be configured to perform control such as all or a part of the multiple shock absorbing units 10 are deployed.

The distance sensor 20 may be configured to sense the distance between the air mobility vehicle M and an object (e.g., the earth surface or an obstacle on the earth surface) disposed below the air mobility vehicle M. The safety controller 30 may be configured to operate the shock absorbing units 10 to be deployed in response to determining that the distance sensed by the distance sensor 20 is equal to or less than a predetermined reference distance. The distance sensor 20 may be implemented with a radar sensor using electromagnetic waves, a LiDAR sensor, an ultrasonic sensor, or a camera sensor. The distance sensors 20 may be configured to sense an area below the air mobility vehicle M and sense the distance between the air mobility vehicle M and an object disposed below the air mobility vehicle M.

The predetermined reference distance may be determined based on a time within which the shock absorbing unit 10 may be deployed. In other words, the reference distance needs to be set to a distance that ensures that the shock absorbing unit 10 may be fully deployed before the air mobility vehicle M collides with the object. In another exemplary embodiment, the predetermined reference distance may be determined based on a rate (e.g., speed) of descending of the air mobility vehicle M. As the speed of descending of the air mobility vehicle M is increased, the predetermined reference distance may be correspondingly increased.

The air mobility control system may further include: one or more descending slowdown units 40 deployed upward from the air mobility vehicle M to increase a resisting force to the gravity of the air mobility vehicle M; and an altitude sensor 50 mounted in the air mobility vehicle M and configured to sense the altitude of the air mobility vehicle M. The safety controller 30 may be configured to execute the deployment of the descending slowdown unit 40 based on the altitude of the air mobility vehicle M when an abnormal descent of the air mobility vehicle M is detected.

The descending slowdown unit 40 may be mounted in the air mobility vehicle M. When the descending slowdown unit 40 is deployed, a resisting force to the gravity of the air mobility vehicle M is increased. For example, the descending slowdown unit 40 may be a parachute that slows the motion of an object. The altitude sensor 50 may be configured to measure the distance between the air mobility M and the ground by sensing the altitude of the air mobility M. The safety controller 30 may be configured to determine whether to deploy the descending slowdown unit 40 and adjust a time when the descending slowdown unit 40 is deployed based on the altitude of the air mobility vehicle M, which is sensed by the altitude sensor 50.

In particular, the safety controller 30 may be configured to deploy the descending slowdown unit 40 when the altitude sensed by the altitude sensor 50 during an abnormal descent of the air mobility vehicle is equal to or greater than a predetermined reference altitude. The predetermined reference altitude may be an altitude at which the descending speed of the air mobility vehicle M may be reduced as desired when the descending slowdown unit 40 is deployed. When the altitude of the air mobility M is less than the predetermined reference altitude, the safety controller 30 may not deploy the descending slowdown unit 40 since the effect of the deployment of the descending slowdown unit 40 is negligible.

The air mobility control system may further include an orientation sensor may be configured to sense the yaw, pitch, or roll of the air mobility vehicle M. The one or more descending slowdown units may be multiple descending slowdown units arranged at intervals in the front-rear direction or the left-right direction of the air mobility vehicle M. The safety controller 30 may be configured to deploy a part or the entirety of the multiple descending slowdown units 40 based on the yaw, pitch, or roll of the air mobility vehicle M, which is sensed by the orientation sensor 60.

The orientation (i.e., yaw, pitch, and roll) of the air mobility vehicle M may be controlled under normal conditions. However, the orientation of the air mobility vehicle M is unable to be controlled in the event of an abnormal descent of the air mobility vehicle M (i.e., event of an aircraft crash). The air mobility vehicle M may be equipped with multiple descending slowdown units 40. The descending slowdown units 40 may be disposed in a left portion and a right portion or in a front portion or a rear portion of the air mobility vehicle V. Each of the descending slowdown units 40 may be operated independently.

The orientation sensor 60 may be configured to sense the orientation (i.e., yaw, pitch, and roll) of the air mobility vehicle M. In other words, the orientation sensor 60 may be configured to sense the orientation of the air mobility vehicle M by sensing a yaw angle, a pitch angle, and a roll angle of the air mobility vehicle M. The safety controller 30 may be configured to deploy a part of or the entirety of the multiple descending slowdown units 40 based on the orientation (yaw angle, pitch angle, and roll angle) of the air mobility vehicle M. When any one of the yaw angle, pitch angle, and roll angle of the air mobility vehicle M is beyond a predetermined angle range, the safety controller 30 may be configured to deploy a part of the multiple descending slowdown units 40, thereby maintaining the appropriate orientation of the air mobility vehicle M.

The air mobility control system may further include a communication unit 70 configured to transmit information regarding the position of the air mobility vehicle M to an external device when the safety controller 30 senses an abnormal descending of the air mobility vehicle M or deploys the shock absorbing unit 10. The communication unit 70 is a device capable of receiving and transmitting data. The data may be text data, voice data, sound data, and/or image data.

When the safety controller 30 detects an abnormal descent of the air mobility vehicle M, the communication unit 70 may be configured to transmit information regarding global positioning system (GPS) position and information regarding descending of the air mobility vehicle M to an external device. The external device may be a device in a fire station, an emergency censor, or a government office. The communication unit 70 may be configured to transmit information regarding GPS position and information regarding descending of the air mobility vehicle M when the safety controller 30 deploys the shock absorbing unit 10, when the safety controller 30 deploys the descending slowdown unit 40, or when there is a risk that the air mobility vehicle M collides with an object such as the ground surface or an obstacle. In particular, a warning signal or notification may be transmitted for rescue when the air mobility vehicle M crashes to or collides with the obstacle.

Figure 4:
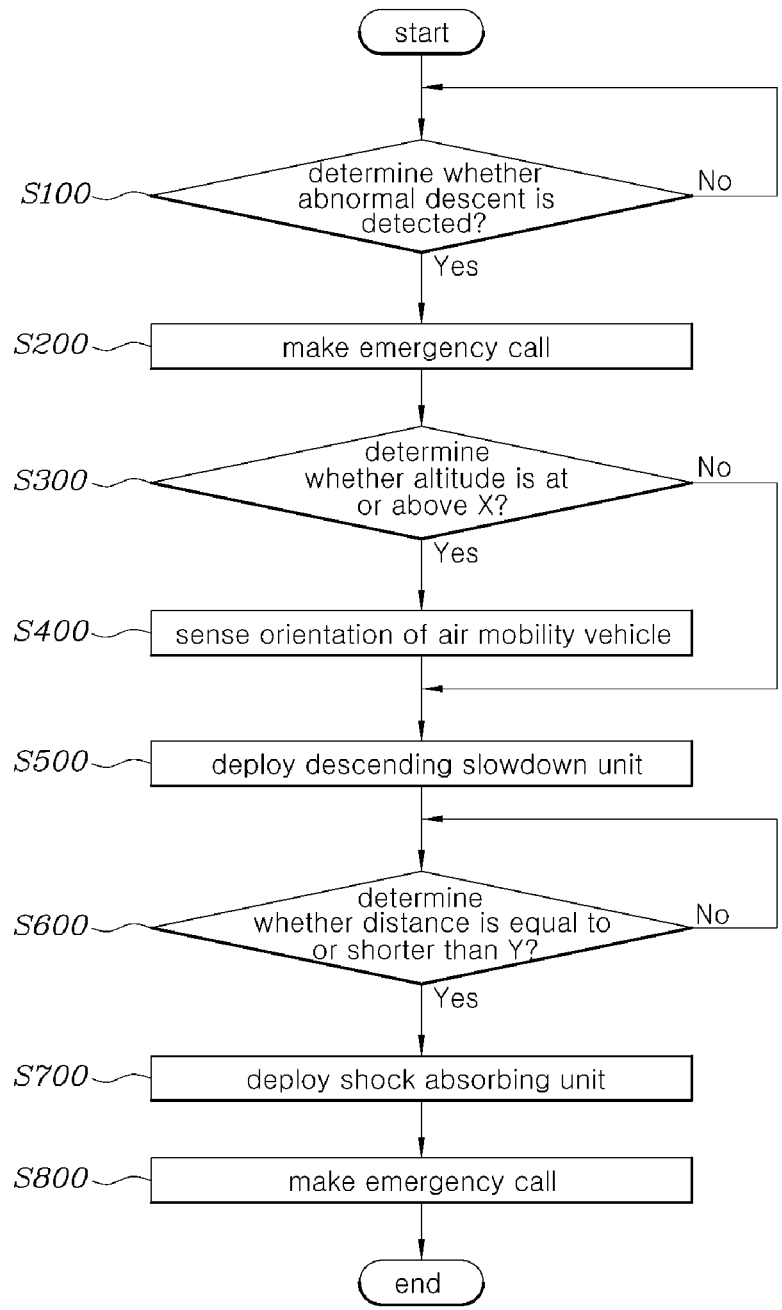
FIG. 4 is a flowchart illustrating an air mobility control method in accordance with an exemplary embodiment of the disclosure.

FIG. 4 is a flowchart illustrating an air mobility control method in accordance with one exemplary embodiment of the disclosure. Referring to FIG. 4, the air mobility control method in accordance with one exemplary embodiment of the disclosure may include: step S100 of sensing an abnormal descent of an air mobility vehicle M; step S600 of sensing the distance between the air mobility vehicle M and an object such as the ground surface or an obstacle; and step S700 of controlling deployment of a shock absorbing unit 10 that is to be deployed downward from the air mobility vehicle M based on the sensed distance.

The method may further include step S200 of transmitting information regarding GPS position of the air mobility vehicle M and information regarding an abnormal descent of the air mobility vehicle M when an abnormal descent of the air mobility vehicle M is detected after step S100. In step S700 in which the deployment of the shock absorbing unit 10 is controlled, the shock absorbing unit may be deployed when the sensed distance to the object (e.g., ground surface or obstacle) is less than a predetermined reference distance.

When an abnormal descent is detected in step S100, the method may further include: step S300 of sensing the altitude of the air mobility vehicle M; and step S500 of controlling a descending slowdown unit to be deployed upward from the air mobility vehicle M based on the sensed altitude to increase a resisting force to the gravity of the air mobility vehicle M. In step S500, when the current altitude of the air mobility vehicle M is equal to or greater than a predetermined reference altitude, the descending slowdown unit 40 may be deployed.

The method further includes step S400 of sensing an orientation of the air mobility vehicle M before step S500 in which multiple descending slowdown units 40 arranged at intervals in a front-rear direction or a left-right direction of the air mobility vehicle M are deployed. The orientation includes a yaw angle, a pitch angle, and a roll angle of the air mobility vehicle M. When deploying the descending slowdown units 40, a part of or the entirety of the multiple descending slowdown units 40 may be deployed based on the orientation (e.g., yaw angle, pitch angle, and roll angle) of the air mobility vehicle M. The method may further include step S800 of transmitting information regarding GPS position of the air mobility vehicle M and information regarding an abnormal descent of the air mobility vehicle M when an abnormal descent of the air mobility vehicle M is detected after step S700 in which the shock absorbing unit 10 is deployed.

Although only specific exemplary embodiments have been described, those skilled in the art will appreciate that various modifications and changes thereto are possible without departing from the scope and spirit of the present disclosure as claimed.

What is claimed is:

1. An air mobility control system, comprising:
   one or more shock absorbing units mounted in an air mobility vehicle and deployed downward from the air mobility vehicle;
   a distance sensor mounted in the air mobility vehicle and configured to sense a distance from air mobility to a ground or an object that the air mobility vehicle approaches;
   a safety controller configured to detect an abnormal descent of the air mobility vehicle and to operate the one or more shock absorbing units to be deployed based on the sensed distance;
   one or more descending slowdown units deployed upward from the air mobility vehicle to increase a resisting force to the descent of the air mobility vehicle; and
   an altitude sensor mounted in the air mobility vehicle and configured to sense the altitude of the air mobility vehicle;
   wherein the safety controller is configured to operate the one or more descending slowdown units to be deployed based on the altitude sensed by the altitude sensor;
   an orientation sensor configured to sense a yaw, pitch, or roll of the air mobility vehicle;
   wherein the one or more descending slowdown units are multiplied descending slowdown units arranged at intervals in the front-rear direction or the left-right direction of the air mobility vehicle; and
   when any one of the yaw, pitch, and roll of the air mobility vehicle is beyond a predetermined range, the safety controller is configured to deploy a part of the multiple descending slowdown units based on the yaw, pitch, or roll sensed by the orientation sensor to maintain the orientation of the air mobility vehicle.

2. The air mobility control system according to claim 1, wherein the one or more shock absorbing units include an airbag cushion to be deployed downward and an inflator that injects gas into the airbag cushion.

3. The air mobility control system according to claim 1, wherein the one or more shock absorbing units are multiple shock absorbing units arranged at intervals in a front-rear direction or a left-right direction of the air mobility vehicle.

4. The air mobility control system according to claim 1, wherein the distance sensor is configured to sense the distance, and the safety controller is configured to operate the one or more shock absorbing units to be deployed when the distance sensed by the distance sensor is equal to or less than a predetermined reference distance in response to detecting the abnormal descent of the air mobility vehicle.

5. The air mobility control system according to claim 1, wherein the safety controller is configured to operate the one or more descending slowdown units to be deployed in response to detecting the abnormal descent of the air mobility vehicle and the altitude sensed by the altitude sensor is equal to or greater than a predetermined reference altitude.

6. The air mobility control system according to claim 1, further comprising a communication unit through which a position of the air mobility vehicle is transmitted to an external device when the safety controller detects the abnormal descent of the air mobility vehicle or when the one or more shock absorbing units are deployed.

7. An air mobility control method, comprising:
   sensing, by a controller, an abnormal descent of an air mobility vehicle;
   sensing, by the controller, a distance from air mobility to a ground or an object in response to detecting the abnormal descent of the air mobility vehicle;
   operating, by the controller, one or more shock absorbing units to be deployed downward from the air mobility vehicle based on the sensed distance;
   sensing, by the controller, the altitude of the air mobility vehicle in response to detecting the abnormal descent of the air mobility vehicle;
   operating, by the controllers, one or more descending slowdown units to be deployed upward from the air mobility vehicle based on the altitude sensed by the altitude sensor to increase a resisting force to descending of the air mobility vehicle; and
   sensing, by the controller, a yaw, pitch, or roll of the air mobility vehicle before operating the one or more descending slowdown units to be deployed;
   wherein the one or more descending slowdown units are multiple descending slowdown units arranged at intervals in the front-rear direction or the left-right direction of the air mobility vehicle; and
   wherein in the operating of the one or more descending slowdown units, when any one of the yaw, pitch, and roll of the air mobility vehicle is beyond a predetermined range, a part of the multiple descending slowdown units are deployed based on the yaw, pitch, or roll sensed by the orientation sensor to maintain the orientation of the air mobility vehicle.

8. The air mobility control method according to claim 7, wherein the one or more shock absorbing units are deployed when the sensed distance is equal to or less than a predetermined reference distance.

9. The air mobility control method according to claim 7, wherein in the operating of the one or more descending slowdown units, the one or more descending slowdown units are deployed when the abnormal descent of the air mobility vehicle is detected and the altitude sensed by the altitude sensor is equal to or greater than a predetermined reference altitude.

* * * * *